US011206052B1

(12) United States Patent
Park et al.

(10) Patent No.: US 11,206,052 B1
(45) Date of Patent: Dec. 21, 2021

(54) SMART SPEAKER

(71) Applicant: HAJEN Co., Ltd, Suwon-si (KR)

(72) Inventors: Jong-Hwa Park, Suwon-si (KR);
Sung-Chul Park, Seongnam-si (KR);
Kyoung-In Cho, Suwon-si (KR)

(73) Assignee: HAJEN Co., Ltd, Suwon-si (KR)

( * ) Notice: Subject to any disclaimer, the term of this patent is extended or adjusted under 35 U.S.C. 154(b) by 0 days.

(21) Appl. No.: 16/905,865

(22) Filed: Jun. 18, 2020

(51) Int. Cl.
*H04B 1/3827* (2015.01)
*G10L 15/30* (2013.01)
*H04R 1/08* (2006.01)
*H04R 3/00* (2006.01)
*H04W 4/80* (2018.01)
*H04W 84/12* (2009.01)
*H04R 1/26* (2006.01)
*H04R 3/12* (2006.01)

(52) U.S. Cl.
CPC ............ *H04B 1/3833* (2013.01); *G10L 15/30* (2013.01); *H04R 1/08* (2013.01); *H04R 1/265* (2013.01); *H04R 3/005* (2013.01); *H04R 3/12* (2013.01); *H04W 4/80* (2018.02); *H04W 84/12* (2013.01); *H04R 2420/07* (2013.01)

(58) Field of Classification Search
CPC ....... H04W 4/80; H04W 84/12; H04W 48/20; H04W 4/12; H04W 76/14; H04W 12/02; H04W 12/06; H04W 12/062; H04W 12/069; H04W 12/084; H04W 12/086; H04W 12/63; H04W 48/16; H04W 4/023; H04W 72/0426; H04W 72/0446; H04W 72/082; H04W 76/10; H04W 80/06; H04W 8/005
USPC .......................................................... 455/73
See application file for complete search history.

(56) References Cited

U.S. PATENT DOCUMENTS

| 2018/0063249 | A1* | 3/2018 | Nguyen .................. H04L 67/42 |
| 2019/0059120 | A1* | 2/2019 | Brennan ............... H04W 48/20 |
| 2019/0251975 | A1* | 8/2019 | Choi ..................... H04L 63/083 |
| 2019/0393932 | A1* | 12/2019 | Hsu ........................ H04B 1/713 |

* cited by examiner

*Primary Examiner* — Ajibola A Akinyemi
(74) *Attorney, Agent, or Firm* — Revolution IP, PLLC (57) ABSTRACT

A smart speaker for providing a sound service based on an artificial intelligence platform, while being communicatively connected to an external server is disclosed. The smart speaker includes a first transceiver for connection to a wireless local area network (WLAN), a second transceiver for connection to a mobile communication network, and a processor configured to control communication connection to the external server through the first transceiver in indoor mode, and control communication with the external server through the second transceiver in outdoor mode.

18 Claims, 8 Drawing Sheets

SMART SPEAKER

BACKGROUND OF THE INVENTION

1. Field of the Invention

The disclosure relates to a smart speaker.

2. Description of the Related Art

A type of wireless speaker, smart speaker is a voice command device with a built-in virtual assistant that provides interactive actions and hands-free activation with the help of one or more keywords.

The smart speaker may act as a smart device using wireless fidelity (Wi-Fi) and widen the use range of audio playback such as control of smart home devices by Bluetooth and other wireless protocol standards.

A smart speaker according to the related art may connect to a network by Wi-Fi only within a spatially limited range (e.g., a home or office). This smart speaker is not capable of accessing the network and thus functions only as a simple Bluetooth speaker, outside the limited range.

The smart speaker causes inconvenience to a user due to the spatial limitations of the smart function.

SUMMARY OF THE INVENTION

Therefore, the disclosure has been made in view of the above problems, and an aspect of the disclosure is to provide a smart speaker that executes a smart function in any place without spatial limitations.

Another aspect of the disclosure is to provide a smart speaker that connects to a network adaptively according to a spatial situation by operating separately in indoor mode and outdoor mode.

Another aspect of the disclosure is to provide a smart speaker that enables connection of a neighboring electronic device to a network by providing a wireless fidelity (Wi-Fi) hotspot function.

In accordance with an embodiment of the disclosure, a smart speaker for providing a sound service based on an artificial intelligence platform, while being communicatively connected to an external server includes a first transceiver for connection to a wireless local area network (WLAN), a second transceiver for connection to a mobile communication network, and a processor configured to control communication connection to the external server through the first transceiver in indoor mode, and control communication with the external server through the second transceiver in outdoor mode.

The smart speaker is further comprising a housing forming the exterior of the smart speaker, and configured to accommodate the first transceiver, the second transceiver, and the processor. The housing exposes an identification module insertion port outward.

The smart speaker is further comprising a speaker configured to output sound according to a control signal received from the processor. The processor is configured to determine sound to be output through the speaker based on location information about the smart speaker, the location information being generated by an identification module.

When the processor determines based on the location information generated by the identification module that the smart speaker has moved from a first country to a second country, the processor is configured to output sound in a language of the second country through the speaker.

When with an identification module inserted into the identification module insertion port, a signal is not received through the first transceiver, the processor is configured to enter the outdoor mode.

The smart speaker is further comprising a physical button formed in at least a part of the housing and configured to convert a physical force into an electrical signal. The processor is configured to enter the outdoor mode based on a signal received from the physical button.

The smart speaker is further comprising a microphone configured to convert sound into an electrical signal. The processor is configured to enter the outdoor mode based on a signal received from the microphone.

The smart speaker is further comprising a third transceiver for short-range communication, configured to receive a control signal from a user terminal. The processor is configured to enter the outdoor mode based on a signal received from the third transceiver.

The smart speaker is further comprising a sensor configured to detect a user's gesture and convert a user gesture input into an electrical signal. The processor is configured to enter the outdoor mode based on a signal received from the sensor The second transceiver executes a wireless fidelity (Wi-Fi) hotspot function, and the Wi-Fi hotspot function is a function of wirelessly connecting to at least one electronic device and providing Internet access to the at least one electronic device.

The smart speaker is further comprising a speaker configured to output sound according to a control signal received from the processor. The processor is configured to determine sound to be output through the speaker according to an electronic device wirelessly connected by the Wi-Fi hotspot function.

The processor is configured to when the processor determines that a first electronic device has been wirelessly connected by the Wi-Fi hotspot function, output music of a first category and when the processor determines that a second electronic device has been wirelessly connected by the Wi-Fi hotspot function, output music of a second category.

When the processor determines that a user terminal has been wirelessly connected by the Wi-Fi hotspot function, the processor is configured to output music related to data generated from the user terminal.

The processor is configured to control a volume of sound output through the speaker according to the number of electronic devices connected by the Wi-Fi hotspot function.

The smart speaker is further comprising an indicator configured to output visible light to the outside. The processor is configured to control at least one of a color, a flashing period, or an intensity of light output through the indicator based on at least one of a strength of a signal received through the second transceiver or a connection state of a mobile communication network through the second transceiver.

The smart speaker is further comprising a speaker configured to output sound according to a control signal received from the processor. The processor is configured to output a first type of sound in the indoor mode and output a second type of sound different from the first type of sound in the outdoor mode The processor is configured to output the sound in a first frequency band in the indoor mode and output the sound in a second frequency band different from the first frequency band in the outdoor mode.

The processor is configured to output the sound in a first amplitude band in the indoor mode and output the sound in a second amplitude band different from the first amplitude band in the outdoor mode.

The smart speaker is further comprising a temperature sensor configured to sense at least one of an ambient temperature or an internal temperature. The processor is configured to determine at least one of the number of operating cores among a plurality of cores or a clock frequency based on a signal received from the temperature sensor in the outdoor mode.

The smart speaker is further comprising a speaker configured to output sound according to a control signal received from the processor. The processor is configured to output sound with a first-level volume in the indoor mode and output sound with a second-level volume different from the first-level volume in the outdoor mode.

BRIEF DESCRIPTION OF THE DRAWINGS

The above and other objects, features and other advantages of the disclosure will be more clearly understood from the following detailed description taken in conjunction with the accompanying drawings, in which.

DETAILED DESCRIPTION OF THE PREFERRED EMBODIMENTS

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given only in consideration of facilitation of description and do not have particular meanings or functions. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

The singular form is intended to include the plural forms as well, unless context clearly indicates otherwise.

In the present application, it will be further understood that the terms "comprises", "includes", etc. specify the presence of stated features, numerals, steps, operations, elements, components, or combinations thereof, but do not preclude the presence or addition of one or more other features, numerals, steps, operations, elements, components, or combinations thereof.

Figure 1:
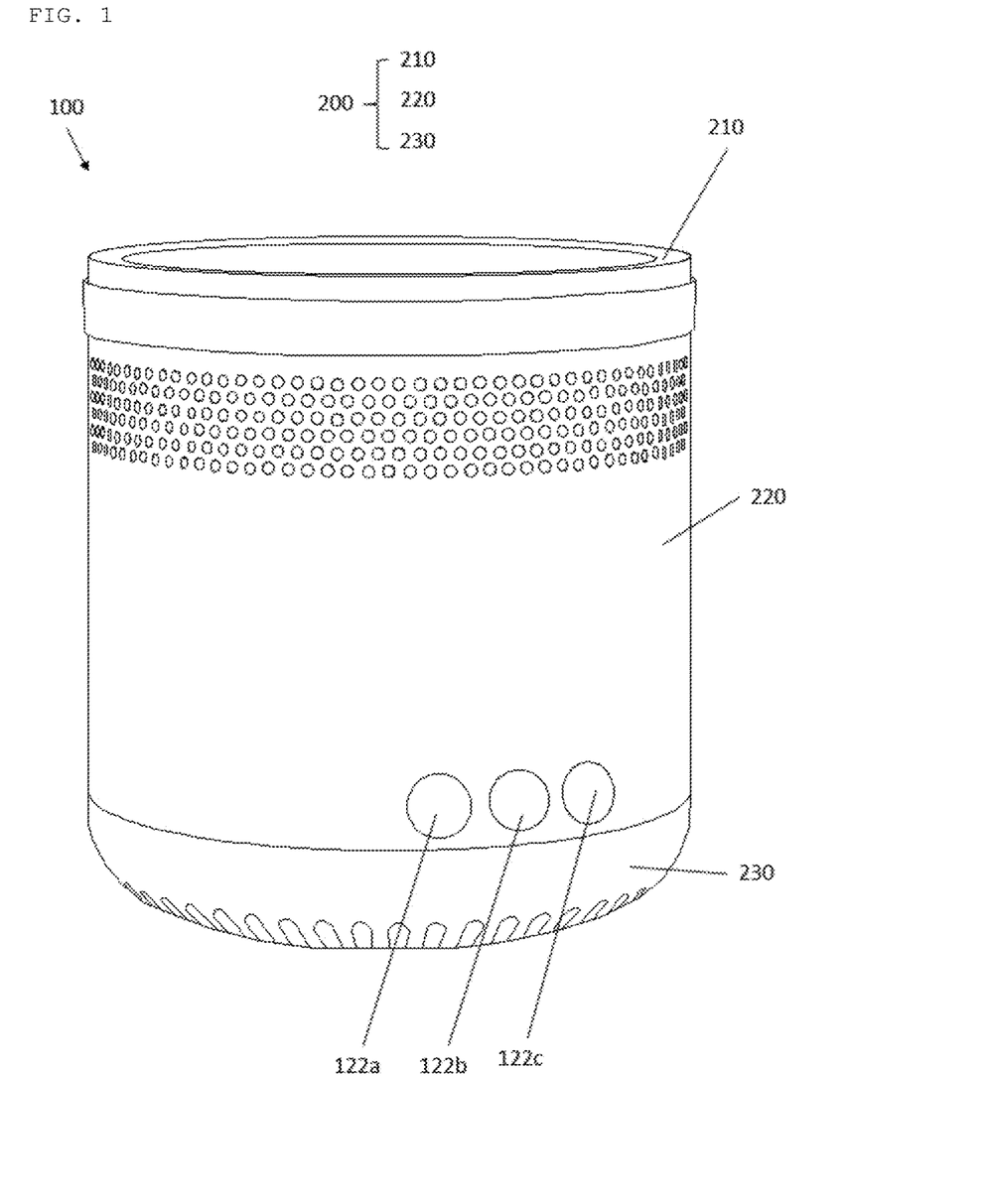
FIGS. 1 and 2 are diagrams illustrating the exterior of a smart speaker according to an embodiment of the disclosure.
Figure 2:
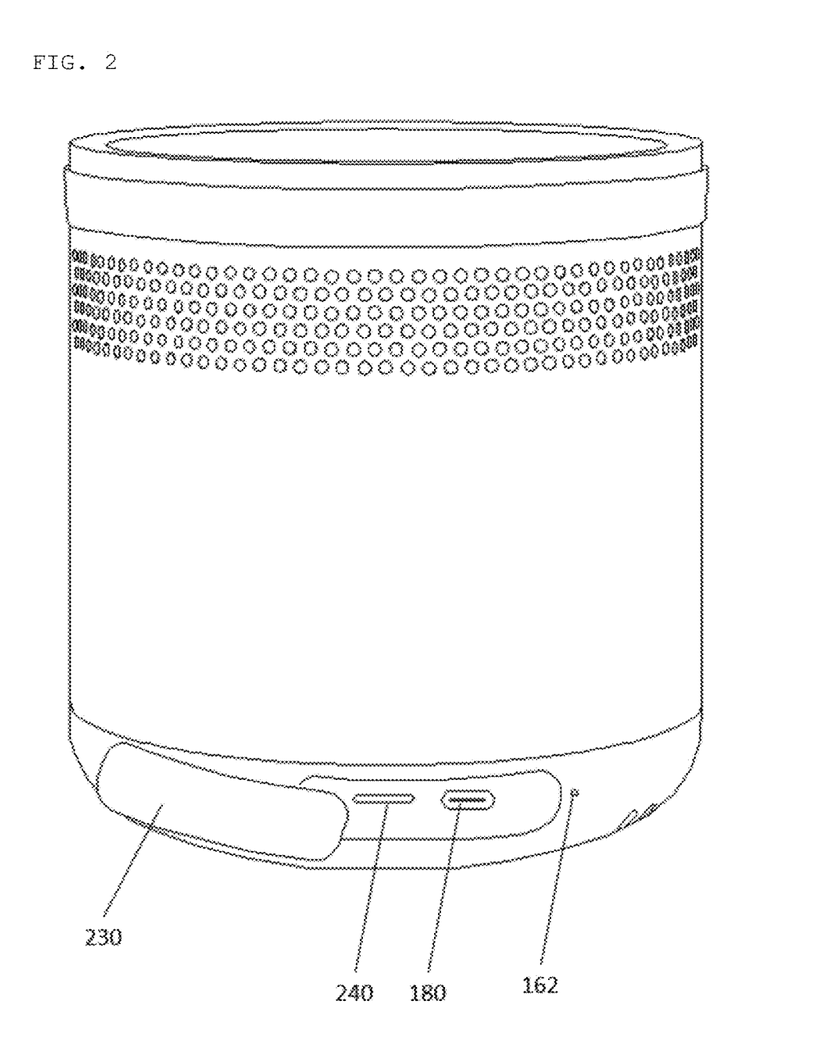
Figure 3:
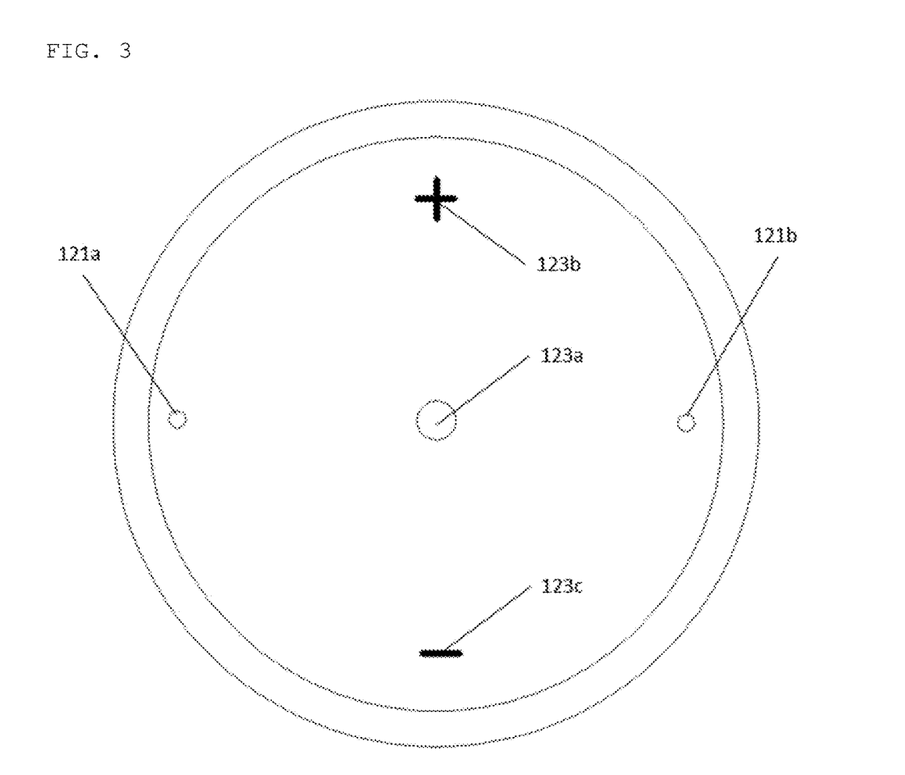
FIG. 3 is a diagram illustrating the smart speaker according to an embodiment of the disclosure, viewed from above.
Figure 4:
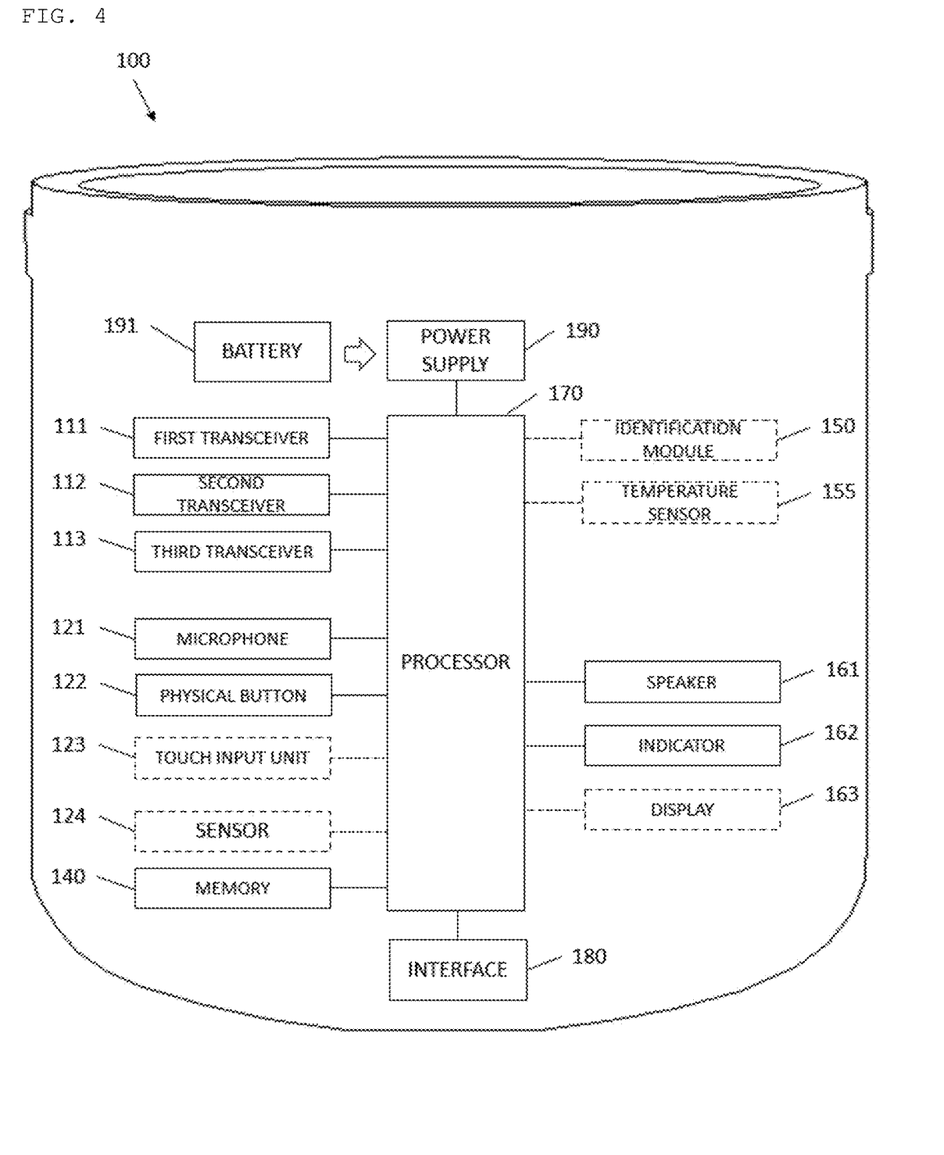
FIG. 4 is a block diagram illustrating the smart speaker according to an embodiment of the disclosure.
Figure 5:
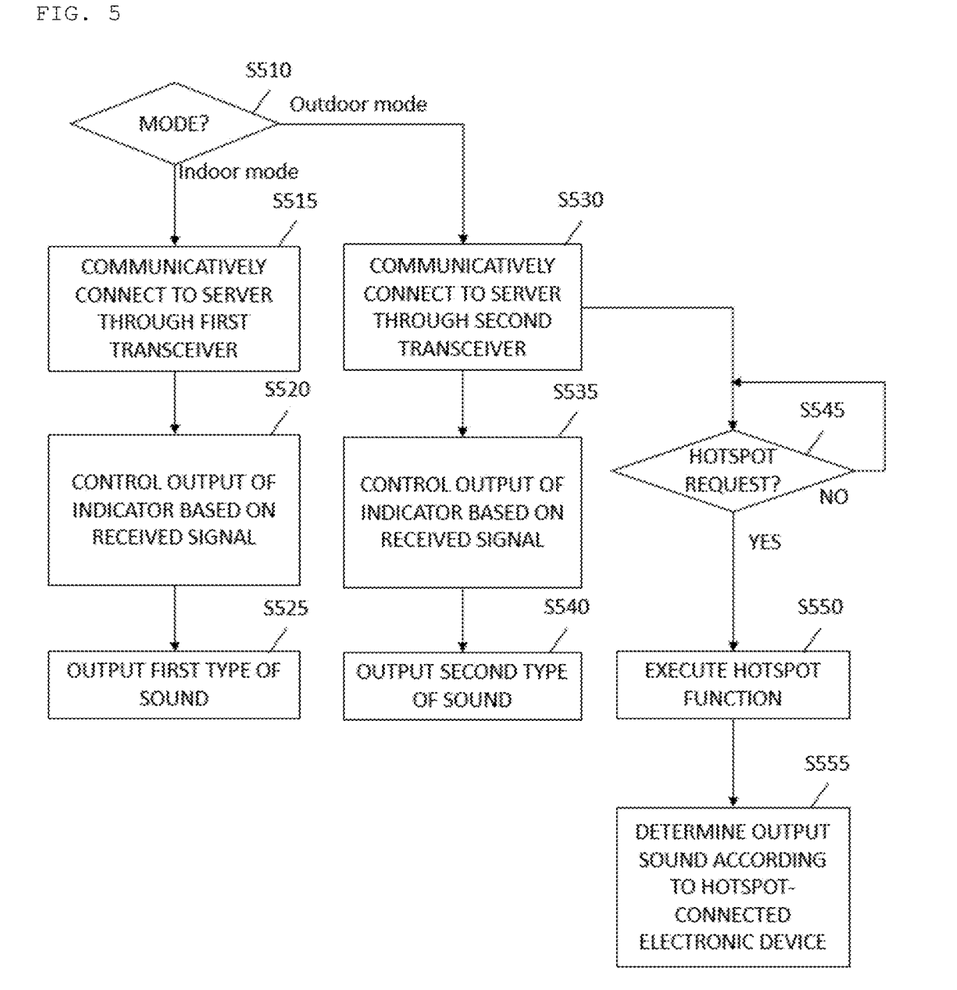
FIG. 5 is a flowchart of an operation of the smart speaker according to an embodiment of the disclosure.
Figure 6:
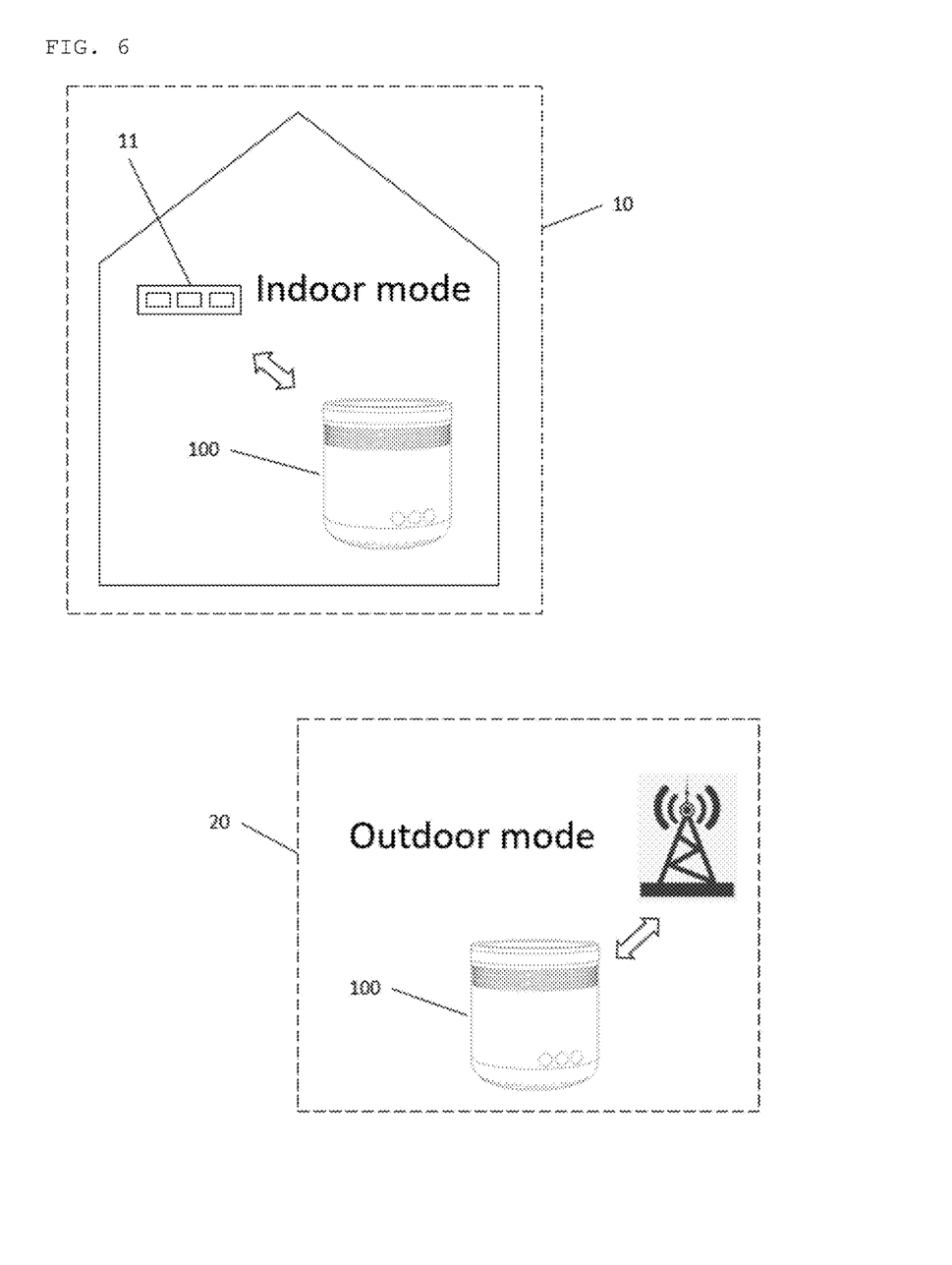
FIG. 6 is a diagram referred to for describing indoor mode and outdoor mode according to an embodiment of the disclosure.
Figure 7:
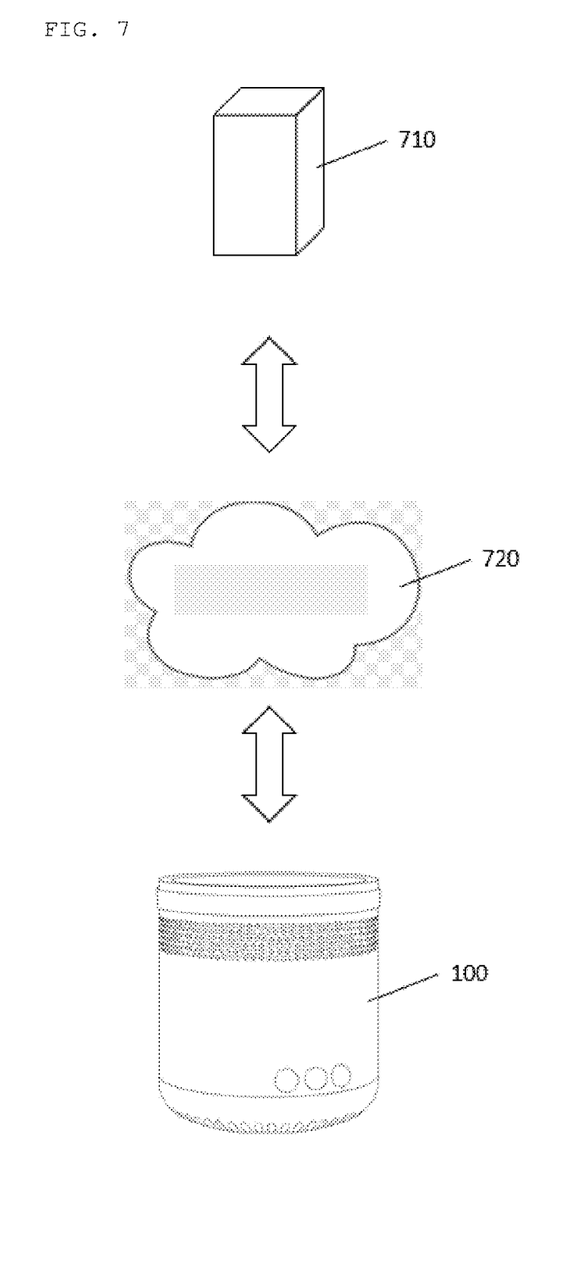
FIG. 7 is a diagram illustrating referring to for describing an operation of the smart speaker according to an embodiment of the disclosure.
Figure 8:
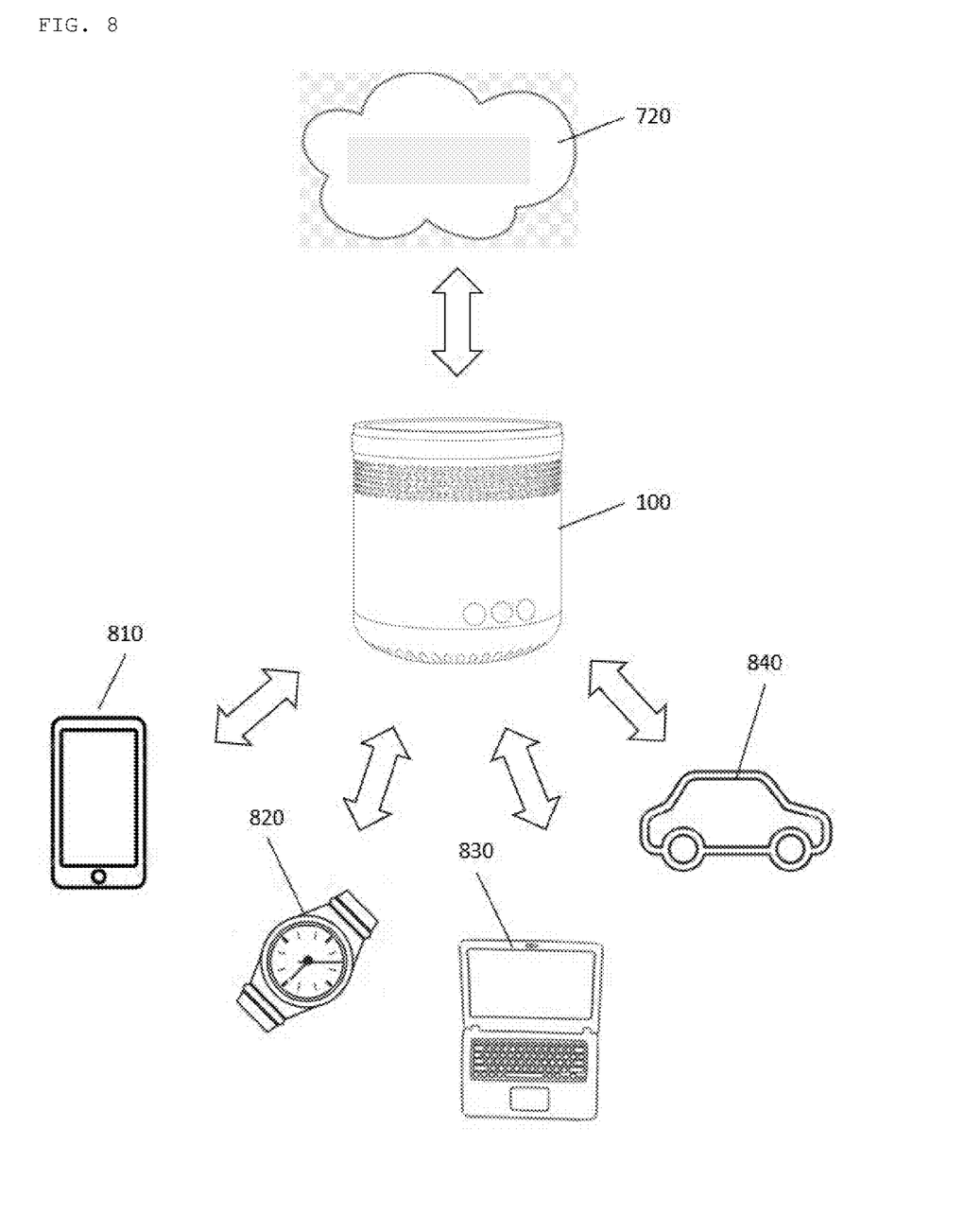
FIG. 8 is a diagram illustrating referring to for describing an operation of the smart speaker according to an embodiment of the disclosure.

FIGS. 1 and 2 are diagrams illustrating the exterior of a smart speaker according to an embodiment of the disclosure;

FIG. 3 is a diagram illustrating the smart speaker according to an embodiment of the disclosure, viewed from above;

FIG. 4 is a block diagram illustrating the smart speaker according to an embodiment of the disclosure;

FIG. 5 is a flowchart of an operation of the smart speaker according to an embodiment of the disclosure;

FIG. 6 is a diagram referred to for describing indoor mode and outdoor mode according to an embodiment of the disclosure;

FIG. 7 is a diagram illustrating referring to for describing an operation of the smart speaker according to an embodiment of the disclosure; and FIG. 8 is a diagram illustrating referring to for describing an operation of the smart speaker according to an embodiment of the disclosure.

Referring to the drawings, a smart speaker 100 may provide a virtual assistant function that provides interactive operations, using an artificial intelligence platform.

According to an embodiment, the artificial intelligence platform for providing the virtual assistant function may be implemented in software or hardware inside the smart speaker 100.

According to an embodiment, the artificial intelligence platform for providing the virtual assistant function may be provided in the form of a cloud service while the smart speaker 100 is communicatively connected to a server.

Once a specific word or sentence spoken by a user is recognized, the smart speaker 100 may activate the virtual assistant function.

The smart speaker 100 may provide a wireless speaker function by short-range communication (e.g., Bluetooth). The smart speaker 100 may output sound based on data provided by a user terminal.

The smart speaker 100 may provide an artificial intelligence platform-based sound service, while being communicatively connected to an external server.

The smart speaker 100 may provide various services to the user by using at least one artificial intelligence platform (e.g., Amazon Alexa, Apple Siri, Google Assistant, and so on).

The smart speaker 100 may include a first transceiver 111, a second transceiver 112, a third transceiver 113, a microphone 121, a physical button 122, a memory 140, a speaker 161, an indicator 162, a processor 170, an interface 180, a power supply 190, and a battery 191.

According to some embodiments, the smart speaker 100 may further include a touch input unit 123, a sensor 124, an identification module 150, a temperature sensor 155, and a display 163, alone or in combination.

The smart speaker 100 may further include a housing 200. The housing 200 may form the exterior of the smart speaker 100. The housing 200 may include a first housing 210, a second housing 220, and a third housing 230. The first housing 210, the second housing 220, and the third housing 230 may be engaged with each other, defining an inner space and forming the exterior of the smart speaker 100.

The housing 200 may accommodate various units of the smart speaker 100 in the inner space. The housing 200 may accommodate, in the inner space, the first transceiver 111, the second transceiver 112, the third transceiver 113, the microphone 121, the physical button 122, the memory 140, the speaker 161, the indicator 162, the processor 170, the interface 180, the power supply 190, the battery 191, the touch input unit 123, the sensor 124, the identification module 150, the temperature sensor 155, and the display 163. Some of the microphone 121, the physical button 122, the speaker 161, the indicator 162, the touch input unit 123, the sensor 124, and the display 163 may be exposed outward from the housing 200.

The housing 200 may expose an identification module insertion port 240 and the interface 180 to the outside. The identification module insertion port 240 may be a universal subscriber identity module (USIM) chip insertion port.

The housing 200 may further include a cover 230. The cover 230 may cover a corresponding part such that foreign materials are not inserted into the identification module insertion port 240 and the interface 180.

The first transceiver 111 may connect to a wireless local area network (WLAN). For example, the first transceiver 111 may be connected to the Internet by a Wi-Fi protocol.

The first transceiver 111 may be communicatively connected to an external server via a WLAN connection. For example, the first transceiver 111 may be communicatively connected to the external server by the Wi-Fi protocol.

To perform communication, the first transceiver 111 may include at least one of a transmission antenna, a reception antenna, a radio frequency (RF) circuit capable of implementing various communication protocols, and an RF element.

The first transceiver 111 may exchange data, signals or information with the external server.

According to some embodiments, the second transceiver 112 may execute a short-range communication function of the third transceiver 113, which will be described later. For example, the first transceiver 111 may implement dual bands conforming to a Wi-Fi 802.11a/b/g/n/ac protocol and a Bluetooth protocol.

The second transceiver 112 may connect to a mobile communication network. For example, the second transceiver 112 may connect to the mobile communication network by at least one protocol of $3^{rd}$ generation (3G), $4^{th}$ generation (4G), long term evolution (LTE), $5^{th}$ generation (5G), evolution-data optimized (EVDO), code division multiple access (CDMA), high speed packet access (HSPA), global system for mobile communications (GSM), or wideband CDMA (WCDMA).

The second transceiver 112 may be communicatively connected to an external server via a mobile communication network connection. For example, the second transceiver 112 may be communicatively connected to the external server by at least one protocol of 3G, 4G, LTE, 5G, EVDO, CDMA, HSPA, GSM, or WCDMA.

To perform communication, the second transceiver 112 may include at least one of a transmission antenna, a reception antenna, an RF circuit capable of implementing various communication protocols, or an RF element.

The second transceiver 112 may exchange data, signals or information with the external server.

The second transceiver 112 may execute a Wi-Fi hotspot function. The Wi-Fi hotspot function may refer to a function of wirelessly connecting to at least one electronic device and providing Internet access to the at least one electronic device.

The third transceiver 113 may conduct short-range communication. For example, the third transceiver 113 may be communicatively connected to a user terminal by the Bluetooth protocol.

To perform communication, the third transceiver 113 may include at least one of a transmission antenna, a reception antenna, an RF circuit capable of implementing various communication protocols, or an RF element.

The third transceiver 113 may exchange data, signals or information with the user terminal.

The third transceiver 113 may receive a control signal from the user terminal. For example, the third transceiver 113 may receive a control signal for entering outdoor mode or indoor mode from the user terminal.

According to an embodiment, the third transceiver 113 may be integrated with the first transceiver 111.

The microphone 121 may convert sound into an electrical signal. Data generated according to the electrical signal may be used in various ways according to an ongoing function (or a running application program) in the smart speaker 100. Various noise canceling algorithms for canceling noise generated in the process of receiving an external sound signal may be implemented in the microphone 121.

The smart speaker 100 may include a plurality of microphones 121. The smart speaker 100 may include 1 to N microphones 121.

The microphone 121 may include a first microphone 121a and a second microphone 121b. The microphone 121 may be configured as a directional microphone. In this case, the processor 170 may selectively process only an electrical signal of sound from a source located in a selected direction based on electrical signals received from the first microphone 121a and the second microphone 121b. The physical button 122 may be formed in at least a part of the housing 200. The physical button 122 may convert a physical force applied from the outside into an electrical signal.

For example, the physical button 122 may include a microphone-off button 122a, a power button 122b, and an activation button 122c for the second transceiver 112.

The touch input unit 123 may include a touch sensor operating in at least one of various touch schemes such as a resistive scheme, a capacitive scheme, an infrared scheme, an ultrasonic scheme, and a magnetic field scheme. The touch sensor may be configured to convert a change in pressure applied to a specific part or a change in capacitance generated in the specific part into an electrical signal.

For example, the touch input unit 123 may include an action button 123a and volume control buttons 123b and 123c.

The action button 123a may be understood as a button for controlling various functions of the smart speaker 100. The action button 123a may interwork with a light emitting element (e.g., light emitting diode (LED)). According to function implementation of the smart speaker 100 based on the action button 123a, elements of light (e.g., the color, flashing frequency, and brightness of light) output from the light emitting element may be controlled by the processor 170.

The sensor 124 may detect a user's gesture and convert the detected gesture input into an electrical signal. For example, the sensor 124 may be configured as at least one of an image-based sensor or an infrared-based sensor.

The memory 140 is electrically connected to the processor 170. The memory 140 may store a computer-readable medium, applications, an operating system, and communication components. The memory 140 may store basic data for units, control data for controlling operations of the units, and input/output data. The memory 140 may store data processed by the processor 170. The memory 140 may be configured in hardware as at least one of a read only memory (ROM), a random access memory (RAM), an erasable programmable ROM (EPROM), a flash drive, or a hard drive. The memory 140 may store various data for the overall operations of the smart speaker 100, such as a program for processing or controlling in the processor 170. The memory 140 may be integrated with the processor 170. According to some embodiments, the memory 140 may be classified as a sub-configuration of the processor 170.

The identification module 150 may be inserted into the port 240. The identification module 150 may include a user identification module (UIM), a subscriber identity module (SIM), a USIM, and so one.

The temperature sensor 155 may sense at least one of an ambient temperature or an internal temperature. The temperature sensor 155 may operate in a contact or non-contact manner. For example, the temperature sensor 155 may be configured as at least one of a negative temperature coefficient (NTC) thermistor, a platinum resistance temperature detector (RTD), a thermocouple, or a semiconductor.

The speaker 161 may convert an electrical signal into sound and output the sound. The speaker 161 may output the sound according to a control signal received from the processor 170.

The speaker 161 may be implemented as a directional speaker. In this case, the speaker 161 may output sound in a selected direction.

The indicator 162 may include at least one light emitting element (e.g., LED). The indicator 162 may output visible light to the outside under the control of the processor 170. The light output from the indicator 162 may be adjusted in color, flashing period, and intensity, under the control of the processor 170.

The display 163 may display graphic objects corresponding to various types of information. The display 163 may include at least one of a liquid crystal display (LCD), a thin film transistor-liquid crystal display (TFT LCD), an organic light emitting diode (OLED), a flexible display, a three-dimensional (3D) display, or an e-ink display.

The display 163 may be formed in a mutual layer structure with the touch input unit 123 or integrated with the touch input unit 123, thereby realizing a touch screen.

The processor 170 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electrical units for executing functions.

The processor 170 may be electrically connected to each unit of the smart speaker 100.

The interface 180 serves as a passage to all external devices connected to the smart speaker 100. The interface 180 receives data or power from an external device, receives power and transmits the data or power to each component inside the smart speaker 100, or transmits data within the smart speaker 100 to the external device. For example, an external charger port, a wired/wireless data port, and a memory card port may be included in the interface 180.

The power supply 190 may supply power required for the operation of each unit in the smart speaker 100 under the control of the processor 170. Particularly, the power supply 190 may receive power from the battery 191 inside the smart speaker 100.

The battery 191 may supply power to the smart speaker 100. The battery 191 may be a built-in battery or a replaceable battery. The battery 191 may be charged by receiving power from the outside through the above-described interface 180. According to some embodiments, the battery 191 may be charged wirelessly without using a connector port. For example, the battery 191 may receive power from a wireless power transmitter in one or both of an inductive coupling scheme based on magnetic induction and a magnetic resonance coupling scheme based on electromagnetic resonance.

Now, a description will be given mainly of operations of the smart speaker in indoor mode and outdoor mode.

The smart speaker 100 may operate in the indoor mode or the outdoor mode.

Indoor mode 10 may be defined as a mode in which the smart speaker 100 located inside a building or the like provides a smart sound service by communicatively connecting to an external server through a network inside the building.

In the indoor mode, the processor 170 may control communication connection to an external server 710 through the first transceiver 111. In the indoor mode, the processor 170 may be communicatively connected to a router 11 through the first transceiver 111. In this case, the smart speaker 100 may be communicatively connected to the external server 710.

The processor 170 may provide the artificial intelligence platform-based sound service based on signals, data, or information received from the external server 710 through the first transceiver 111. For example, the processor 170 may convert a user's sound received through the microphone 121 into text. The processor 170 may transmit the text data to the external server 710 through the first transceiver 111. The processor 170 may receive text data from the external server 710 through the first transceiver 111. The processor 170 may convert the text data into sound and output the sound through the speaker 161.

Outdoor mode 20 is defined as a mode in which the smart speaker 100 located outside a building or the like provides the smart sound service by communicatively connecting to the external server 710 through a mobile communication network.

The processor 170 may control communication connection to the external server 710 through the second transceiver 112 in the outdoor mode. In the outdoor mode, the processor 170 may connect to the mobile communication network through the second transceiver 112. In this case, the smart speaker 100 may be communicatively connected to the external server 710.

The processor 170 may provide the artificial intelligence platform-based sound service based on signals, data, or information received from the external server 710 through the second transceiver 112. For example, the processor 170 may convert a user's sound received through the microphone 121 into text. The processor 170 may transmit the text data to the external server 710 through the second transceiver 112. The processor 170 may receive text data from the external server 710 through the second transceiver 112. The processor 170 may convert the text data into sound and output the sound through the speaker 161.

The external server 710 may provide a service by using an artificial intelligence platform. For example, the external server 710 may be a server provided for providing a service based on an artificial intelligence platform in Google, Apple, Amazon, or the like.

The processor 170 may obtain information about the location of the smart speaker 100 through the identification module 150. For example, with a USIM inserted in the identification module insertion port 240, the processor 170 may identify the location of the smart speaker 100 according to the result of exchanging signals with at least one base station (BS).

The processor 170 may determine sound output through the speaker 161 based on location information about the smart speaker 100, generated by the identification module 150.

The processor 170 may output sound in a language used where the smart speaker 100 is located. For example, when the processor 170 determines that the smart speaker 100 has moved from a first country to a second country, based on the location information generated by the identification module 150, the processor 170 may output sound in a language of the second country through the speaker 161.

The processor 170 may output different types of sound according to a place where the smart speaker 100 is located. For example, when the processor 100 determines that the smart speaker 100 is located in a first place (or country), the processor 170 may output a first type of sound. When the processor 100 determines that the smart speaker 100 is located in a second place (or country), the processor 170 may output a second type of sound. The first type of sound may have a first frequency band, a first amplitude band, and a first tone color. The second type of sound may have a second frequency band different from the first frequency band, a second amplitude band different from the first amplitude band, and a second tone color different from the first tone color.

The processor 170 may function as an automatic translator by receiving sound in a first language and outputting the sound in a second language.

When a preset condition is satisfied, the processor 170 may switch from the indoor mode 10 to the outdoor mode 20.

For example, when with the identification module 150 inserted into the identification module insertion port 240, a signal has not been received through the first transceiver 111, the processor 170 may enter the outdoor mode 20.

For example, the processor 170 may enter the outdoor mode 20 based on a signal received from the physical button 122c for activating the second transceiver 112.

For example, the processor 170 may enter the outdoor mode 20 based on a signal received from the microphone 121. For example, when a user's voice command for switching to the outdoor mode is received through the microphone 121, the processor 170 may enter the outdoor mode 20.

For example, the processor 170 may enter the outdoor mode 20 based on a signal received through the third transceiver 113. For example, when a control signal for switching to the outdoor mode is received from the user terminal, the processor 170 may enter the outdoor mode 20.

For example, the processor 170 may enter the outdoor mode 20 based on a signal received from the sensor 124. For example, when a user's gesture input for switching to the outdoor mode 20 is received at the sensor 124, the processor 170 may enter the outdoor mode 20.

As illustrated in FIG. 8, the processor 170 may activate the Wi-Fi hotspot function. For example, when the processor 170 receives a request signal from at least one neighboring electronic device 810, 820, 830, or 840, the processor 170 may activate the Wi-Fi hotspot function through the second transceiver 112.

The at least one electronic device 810, 820, 830, or 840 may be connected to the network 720 through the smart speaker 100.

The processor 170 may determine sound output through the speaker 161 according to an electronic device wirelessly connected by the Wi-Fi hotspot function.

For example, when the processor 170 determines that a first electronic device is wirelessly connected by the Wi-Fi hotspot function, the processor 170 may output music of a first category. When the processor 170 determines that a second electronic device is wirelessly connected by the Wi-Fi hotspot function, the processor 170 may output music of a second category.

For example, when the processor 170 determines that a user terminal (e.g., smart phone) 810 is connected through the Wi-Fi hotspot function, the processor 170 may output sound associated with data generated from the user terminal 810. The data generated from the user terminal 810 may include at least one of user preference music data, portal search record data, or social networking service (SNS) record data.

For example, when the processor 170 determines that a wearable device 820 for workout is connected through the Wi-Fi hotspot function, the processor 170 may select and output music suitable for workout.

For example, when the processor 170 determines that a laptop computer 830 is connected through the Wi-Fi hotspot function, the processor 170 may select and output music suitable for working.

For example, when the processor 170 determines that a vehicle 840 is connected through the Wi-Fi hotspot function, the processor 170 may select and output music suitable for driving.

The processor 170 may control an output of the indicator 162 based on a signal received through the second transceiver 112.

The processor 170 may adjust the volume of sound output through the speaker 161 according to the number of electronic devices connected through the Wi-Fi hotspot function. For example, as more electronic devices are connected through the Wi-Fi hotspot function, the processor 170 may control the speaker 161 to output sound at a louder level. Through this control, the user may recognize the number of electronic devices connected through the Wi-Fi hotspot function.

For example, the processor 170 may control at least one of the color, flashing period, or intensity of light output through the indicator 162 based on the strength of a signal received through the second transceiver 112.

For example, the processor 170 may control at least one of the color, flashing period, or intensity of light output through the indicator 162 based on the connection state of the mobile communication network through the second transceiver 112.

The processor 170 may output different types of sound in the indoor mode 10 and the outdoor mode 20.

The processor 170 may control the speaker 161 to output a first type of sound in the indoor mode 10. The first type of sound may have a first frequency band, a first amplitude band, and a first tone color.

The processor 170 may control the speaker 161 to output a second type of sound different from the first type in the outdoor mode 20. The second type of sound may have a second frequency band different from the first frequency band, a second amplitude band different from the first amplitude band, and a second tone color different from the first tone color.

The processor 170 may control the speaker 161 to output sound in the first frequency band in the indoor mode 10 and sound in the second frequency band different from the first frequency band in the outdoor mode 20.

The processor 170 may control the speaker 161 to output sound in the first amplitude band in the indoor mode 10 and sound in the second amplitude band different from the first amplitude band in the outdoor mode 20.

The processor 170 may control the speaker 161 to output sound of the first tone color in the indoor mode 10 and sound of the second tone color different from the first tone color in the outdoor mode 20.

For example, the processor 170 may control the speaker 161 to output sound by a female voice in the indoor mode 10 and sound by a male voice in the outdoor mode 20.

For example, the processor 170 may control the speaker 161 to output sound by a male voice in the indoor mode 10 and sound by a female voice in the outdoor mode 20.

The processor 170 may control at least one of the processing speed or processing amount of the processor 170 based on a signal received from the temperature sensor 155 in the outdoor mode 20.

The processor 170 may determine the number of operating cores from among a plurality of cores based on the signal received from the temperature sensor 155 in the outdoor mode 20. For example, the processor 170 may include a plurality of cores. When the ambient temperature or internal temperature of the smart speaker 100 is equal to or greater than a reference value, the processor 170 may control only some of the plurality of cores to operate.

The processor 170 may determine a clock frequency based on a signal received from the temperature sensor 155 in the outdoor mode 20. When the ambient temperature or internal temperature of the smart speaker 100 is equal to or greater than a reference value, the processor 170 may lower the clock frequency.

Through this control, a malfunction caused by overheating of the processor 170 may be prevented.

The processor 170 may adjust the volume of output sound according to the mode state of the smart speaker 100. For example, the processor 170 may control the speaker 161 to output sound with a first-level volume in the indoor mode 10, and sound with a second-level volume different from the first-level volume in the outdoor mode 20.

When the smart speaker 100 switches from the indoor mode 10 to the outdoor mode 20, the processor 170 may switch the sound output from the speaker 161 from the first-level volume to the second-level volume. In this case, the processor 170 may control the sound volume to be gradually changed for a certain period of time without changing the sound volume instantaneously.

When the smart speaker 100 switches from the outdoor mode 20 to the indoor mode 10, the processor 170 may switch the sound output to the speaker 161 from the second-level volume to the first-level volume. In this case, the processor 170 may control the sound volume to be gradually changed for a certain period of time without changing the sound volume instantaneously.

Through this control, it is possible to output sound with a volume suitable for a surrounding situation.

The processor 170 may control at least one of the speaker 161, the indicator 162, or the display 163 according to whether a USIM is mounted. For example, the processor 170 may output an alarm, when the USIM is not mounted.

In the outdoor mode 20, the processor 170 may provide a call function on behalf of the smartphone, when the user's USIM is mounted.

In the outdoor mode 20, the processor 170 may control at least one of the speaker 161, the indicator 162, or the display 163 according to the state of the battery 191. For example, in the outdoor mode 20, the processor 170 may output an alarm, when the remaining amount of stored electric energy of the battery 191 is equal to or less than a reference value.

The processor 170 may perform a program update according to a request from the external server 710. For example, when a program update request signal is received from the external server 710, the processor 170 does not perform a program update in the outdoor mode 20, and performs a program update in the indoor mode 10. According to an embodiment, upon receipt of a user request, the processor 170 may perform a program update even in the outdoor mode 20.

As illustrated in FIG. 5, the smart speaker 100 may operate in the following order.

The processor 170 may determine a mode state of the smart speaker 100 (S510).

When the smart speaker 100 is in the indoor mode 10, the processor 170 may be communicatively connected to the external server 710 through the first transceiver 111 (S515).

The processor 170 may control an output of the indicator 162 based on a signal received through the first transceiver 111 (S520). For example, the processor 170 may control at least one of the color, flashing period, or intensity of light output through the indicator 162 based on the strength of the signal received through the first transceiver 111. For example, the processor 170 may control at least one of the color, flashing period, or intensity of light output through the indicator 162 based on a connection state of WLAN through the first transceiver 111.

The processor 170 may control the speaker 161 to output a first type of sound, while being connected to the WLAN through the first transceiver 111 (S525).

When the smart speaker 100 is in the outdoor mode 20, the processor 170 may be communicatively connected to the external server 710 through the second transceiver 112 (S530).

The processor 170 may control the output of the indicator 162 based on a signal received through the second transceiver 112 (S535). For example, the processor 170 may control at least one of the color, flashing period, or intensity of light output through the indicator 162 based on the strength of the signal received through the second transceiver 112. For example, the processor 170 may control at least one of the color, flashing period, or intensity of light output through the indicator 162 based on a connection state of a mobile communication network through the second transceiver 112.

After operation S530, the processor 170 may determine whether a hotspot request signal has been received from a neighboring electronic device 810, 820, 830, or 840 (S545).

When the hotspot request signal has been received, the processor 170 may execute a hotspot function (S550).

The processor 170 may determine output sound according to the hotspot-connected electronic device (S555).

As is apparent from the above description, the disclosure has one or more effects such as the following one.

Because the smart speaker is capable of connecting to a network irrespective of a space in which the smart speaker is located, a smart function is provided even outside a building.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The function of the processor 170 in the present invention may be implemented as code that can be written on a computer-readable recording medium and thus read by a computer system. The computer-readable recording medium may be any type of recording device in which data is stored in a computer-readable manner. Examples of the computer-readable recording medium include a hard disk drive (HDD), a solid state drive (SSD), a silicon disk drive (SDD), a read only memory (ROM), a random access memory (RAM), a compact disk ROM (CD-ROM), a magnetic tape, a floppy disk, an optical data storage, and a carrier wave (e.g., data transmission over the Internet).

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A smart speaker for providing a sound service based on an artificial intelligence platform, while being communicatively connected to an external server, the smart speaker comprising:
    a first transceiver for connection to a wireless local area network (WLAN);
    a second transceiver for connection to a mobile communication network;
    a processor configured to:
        control communication connection to the external server through the first transceiver in indoor mode; and
        control communication with the external server through the second transceiver in outdoor mode,
    a housing forming the exterior of the smart speaker, and configured to accommodate the first transceiver, the second transceiver, and the processor; and
    a speaker configured to output sound according to a control signal received from the processor,
    wherein the housing exposes an identification module insertion port outward, the identification module insertion port being a universal subscriber identity module (USIM) chip insertion port and the processor configured to output an alarm, when the USIM chip is not inserted into the identification module insertion port,
    wherein, with the USIM chip inserted into the identification module insertion port, the processor is configured to acquire location information of the smart speaker according to the result of exchanging signals with at least one base station,
    wherein the processor is configured to determine sound to be output through the speaker based on the location information of the smart speaker,
    wherein the processor is configured to output different types of sound base the location information,
    wherein, when the processor determines that the smart speaker is located in a first place, the processor is configured to output a first frequency band,
    wherein, when the processor determines that the smart speaker is located in a second place, the processor is configured to output a second frequency band different from the first frequency band,
    wherein, in the outdoor mode, the processor is configured to provide a call function on behalf of the smartphone, when the user's USIM chip is inserted into the identification module insertion port.

2. The smart speaker according to claim 1, wherein when the processor determines based on the location information generated by the identification module that the smart speaker has moved from a first country to a second country, the processor is configured to output sound in a language of the second country through the speaker.

3. The smart speaker according to claim 1, wherein when with an identification module inserted into the identification module insertion port, a signal is not received through the first transceiver, the processor is configured to enter the outdoor mode.

4. The smart speaker according to claim 1, further comprising a physical button formed in at least a part of the housing and configured to convert a physical force into an electrical signal,
    wherein the processor is configured to enter the outdoor mode based on a signal received from the physical button.

5. The smart speaker according to claim 1, further comprising a microphone configured to convert sound into an electrical signal,
    wherein the processor is configured to enter the outdoor mode based on a signal received from the microphone.

6. The smart speaker according to claim 1, further comprising a third transceiver for short-range communication, configured to receive a control signal from a user terminal,
    wherein the processor is configured to enter the outdoor mode based on a signal received from the third transceiver.

7. The smart speaker according to claim 1, further comprising a sensor configured to detect a user's gesture and convert a user gesture input into an electrical signal,
    wherein the processor is configured to enter the outdoor mode based on a signal received from the sensor.

8. The smart speaker according to claim 1, wherein the second transceiver executes a wireless fidelity (Wi-Fi) hotspot function, and
    wherein the Wi-Fi hotspot function is a function of wirelessly connecting to at least one electronic device and providing Internet access to the at least one electronic device.

9. The smart speaker according to claim 8,
    wherein the processor is configured to determine sound to be output through the speaker according to an electronic device wirelessly connected by the Wi-Fi hotspot function.

10. The smart speaker according to claim 9, wherein the processor is configured to:
    when the processor determines that a first electronic device has been wirelessly connected by the Wi-Fi hotspot function, output music of a first category; and
    when the processor determines that a second electronic device has been wirelessly connected by the Wi-Fi hotspot function, output music of a second category.

11. The smart speaker according to claim 9, wherein when the processor determines that a user terminal has been wirelessly connected by the Wi-Fi hotspot function, the processor is configured to output music related to data generated from the user terminal.

12. The smart speaker according to claim 9, wherein the processor is configured to control a volume of sound output through the speaker according to the number of electronic devices connected by the Wi-Fi hotspot function.

13. The smart speaker according to claim 1, further comprising an indicator configured to output visible light to the outside,
 wherein the processor is configured to control at least one of a color, a flashing period, or an intensity of light output through the indicator based on at least one of a strength of a signal received through the second transceiver or a connection state of a mobile communication network through the second transceiver.

14. The smart speaker according to claim 1,
 wherein the processor is configured to:
 output a first type of sound in the indoor mode; and
 output a second type of sound different from the first type of sound in the outdoor mode.

15. The smart speaker according to claim 14, wherein the processor is configured to:
 output the sound in a first frequency band in the indoor mode; and
 output the sound in a second frequency band different from the first frequency band in the outdoor mode.

16. The smart speaker according to claim 14, wherein the processor is configured to:
 output the sound in a first amplitude band in the indoor mode; and
 output the sound in a second amplitude band different from the first amplitude band in the outdoor mode.

17. The smart speaker according to claim 1, further comprising a temperature sensor configured to sense at least one of an ambient temperature or an internal temperature,
 wherein the processor is configured to determine at least one of the number of operating cores among a plurality of cores or a clock frequency based on a signal received from the temperature sensor in the outdoor mode.

18. The smart speaker according to claim 1, further comprising a speaker configured to output sound according to a control signal received from the processor,
 wherein the processor is configured to:
 output sound with a first-level volume in the indoor mode; and
 output sound with a second-level volume different from the first-level volume in the outdoor mode.

* * * * *